Oct. 20, 1970 F. BYRNE 3,535,497

BCD TO DECIMAL DECODER

Filed June 21, 1967 2 Sheets-Sheet 1

INVENTOR.
FRANK BYRNE

BY Glenn & Cox
William H. King
ATTORNEYS.

DISPLAY DECODER TRUTH TABLE

| DISPLAYED NUMBER | BCD INPUT SIGNAL | | | | LIGHT BULB FEEDBACK SIGNAL | | |
|---|---|---|---|---|---|---|---|
| | BINARY 1 | BINARY 2 | BINARY 4 | BINARY 8 | LIGHT 0 | LIGHT 7 | LIGHT 9 |
| 0 | FALSE (0V) | FALSE (0V) | FALSE (0V) | FALSE (0V) | | | |
| 1 | | FALSE (0V) | FALSE (0V) | FALSE (0V) | OUT (0V) | | |
| 2 | FALSE (0V) | | FALSE (0V) | FALSE (0V) | OUT (0V) | | |
| 3 | TRUE (-6V) | TRUE (-6V) | | | | OUT (-6V) | |
| 4 | FALSE (0V) | FALSE (0V) | | FALSE (0V) | OUT (0V) | | |
| 5 | TRUE (-6V) | | TRUE (-6V) | | | OUT (-6V) | |
| 6 | | TRUE (-6V) | TRUE (-6V) | | | OUT (-6V) | |
| 7 | TRUE (-6V) | TRUE (-6V) | TRUE (-6V) | | | | |
| 8 | | | | TRUE (-6V) | | | OUT (-6V) |
| 9 | TRUE (-6V) | | | TRUE (-6V) | | | |

Fig. 4.

INVENTOR.
FRANK BYRNE
BY [signature] William H. King
ATTORNEYS.

United States Patent Office 3,535,497

Patented Oct. 20, 1970

3,535,497

BCD TO DECIMAL DECODER

Frank Byrne, Cocoa Beach, Fla., assignor to the United States of America as represented by the Administrator of the National Aeronautics and Space Administration Filed June 21, 1967, Ser. No. 649,076
Int. Cl. H03k 13/24, 13/243
U.S. Cl. 235—155 2 Claims

ABSTRACT OF THE DISCLOSURE

A decoder which utilizes a plurality of gates for decoding binary signals into their decimal constituents. The decoder utilizes feed-back or inhibit signals for preventing erroneous decoding or displaying of the decimal constituents.

The invention described herein was made by an employee of the United States Government and may be manufactured and used by or for the Government of the United States of America for governmental purposes without the payment of any royalties thereon or therefor.

This invention relates to a decoder for converting binary coded decimal signals into their decimal constituents, and more particularly to a decoder which utilizes feed-back signals for preventing erroneous signals from being displayed.

Heretofore, decoders provided for decoding binary coded decimal (BCD) signals into their decimal constituents and displaying same required the complement of the binary coded decimal signal to be transmitted with the signal. Such required the use of additional interconnecting circuits which utilized either more logic circuits and/or additional interconnections. Instead of generating the complement of the binary coded decimal signal within the decoder or transmitting the same over additional wires, the decoder constructed in accordance with the present invention utilizes unique decoded BCD values for particular decimal numbers. The outputs of certain preselected logic circuits are fed back to the input of other preselected logic circuits to inhibit the activation of such. This eliminates the need of transmitting the complement of the BCD signals over additional wires or utilizing additional logic circuits.

In accordance with the present invention, it has been found that the foregoing difficulties encountered in decoding BCD signals into their decimal constituents and displaying such may be overcome by providing a novel decoder. This decoder includes the following basic parts: (1) a logic gating circuit provided for each decimal constituent which is to be produced, (2) a display means connected to the output of each gating circuit being activated responsive to selected binary input signals being supplied to the respective gating circuit, (3) selected parallel input leads connected to each gating circuit for receiving BCD signals in parallel form for activating a particular gating circuit when the BCD signals make-up the decimal constituent for the particular gating circuit, (4) feed-back circuits connected to the output of selected logic gates for supplying inhibit signals to certain logic gates for preventing activation of same when an inhibit signal is supplied thereto. Thus, a minimum number of input BCD signals can be utilized to energize a display means while preventing other display means from being erroneously energized. A logic gate is provided for each of the decimal constituents 0 through 9 and a feed-back circuit is coupled to the outputs of the logic gates provided for displaying the decimal constituents 0, 7 and 9.

Accordingly, it is an important object of the present invention to provide a decoder which converts BCD signals into their decimal constituents, while utilizing a minimum of components.

Another important object of the present invention is to provide a simple, inexpensive, and reliable decoder for converting BCD signals into their decimal constituents, while preventing erroneous activation of signal means associated with the decoder.

Still another important object of the present invention is to provide a simple decoder for converting BCD signals into their decimal constituents without having to transmit the complement of the BCD signals.

A further important object of the present invention is to provide a decoder which utilizes feed-back signals from certain preselected logic circuits for inhibiting the operation of other logic circuits, thus eliminating the possibility of displaying erroneous signals.

Other objects and advantages of this invention will become more apparent from a reading of the following detailed description and appended claims, taken in conjunction with the accompanying drawings wherein:

FIG. 4 is a truth table illustrating the logic levels required to activate the indicators associated with the logic circuits.

Figure 1:
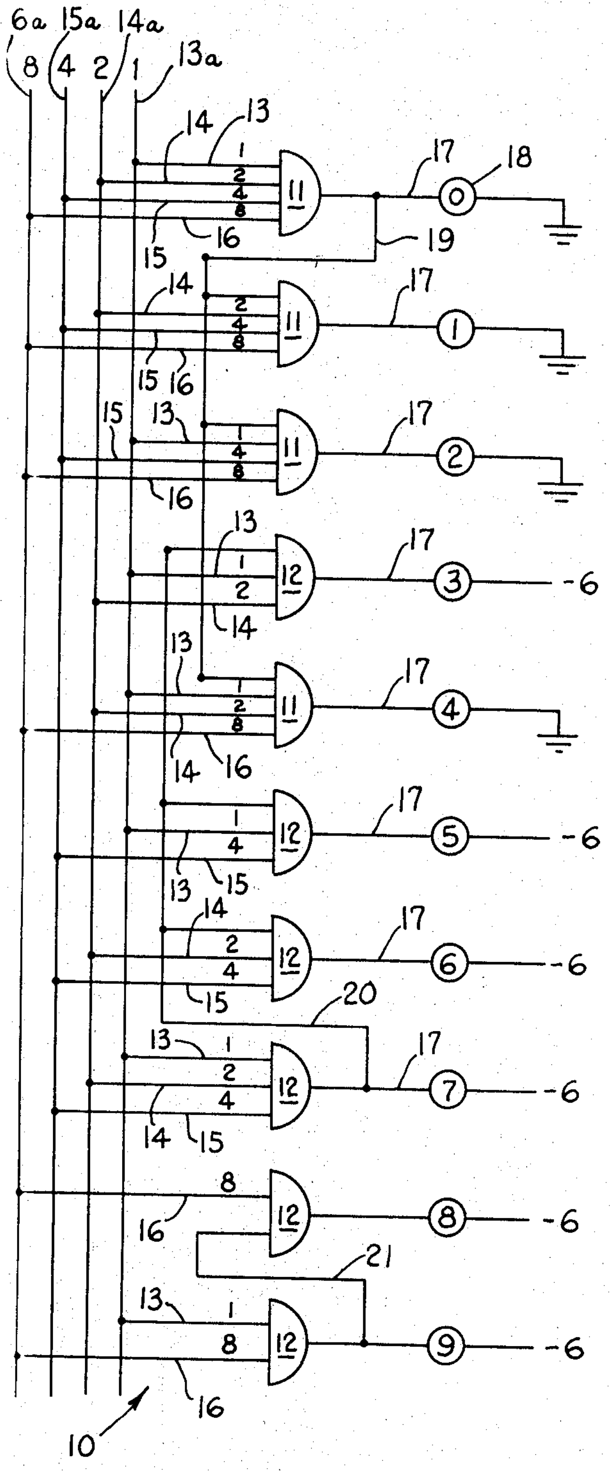
FIG. 1 is a schematic diagram of a decoder constructed in accordance with the present invention for converting binary coded decimal signals into their decimal constituents.
Figure 2:
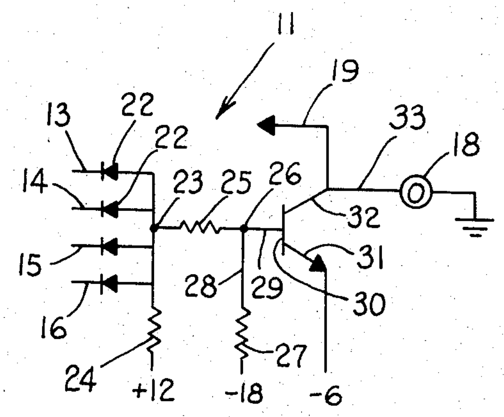
FIG. 2 is a schematic diagram of one logic gating circuit utilized in the decoder.
Figure 3:
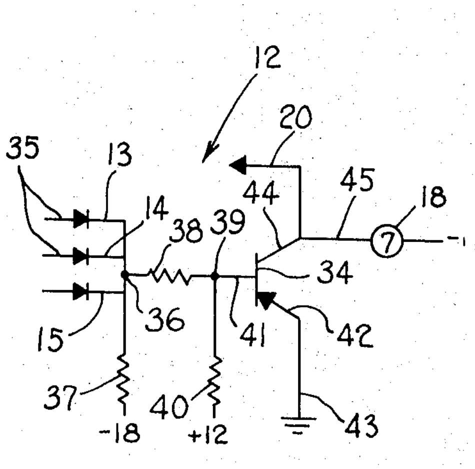
FIG. 3 is a schematic diagram of another logic gating circuit utilized in the decoder.

Referring now in more detail to the drawings, wherein like reference numerals designate identical or corresponding parts throughout, and with special attention to FIG. 1, reference numeral 10 generally designates a decoder constructed in accordance with the present invention. The decoder shown in FIG. 1 illustrates the decimal constituents or numerals 0 through 9 being displayed by appropriate lamps. It is to be understood, however, that other numerals could be displayed in a similar manner. The decoder utilizes a pair of "AND" logic gates 11 and 12, respectively, the details of which are illustrated in FIGS. 2 and 3.

Each of the logic gating circuits has some of input conductors 13 through 16, respectively, connected thereto. Only the appropriate input conductors are connected to the logic gating circuits for decoding a particular BCD signal. The input conductors 13 through 16 are, in turn, connected to input leads **13*a* through 16*a*, respectively, upon which BCD signals are supplied from any suitable source, such as from a computer. When a binary signal is supplied to input lead 13*a* such represents the valve of $2^0$ which is equal to 1. A signal on the input lead 14*a* represents $2^1$ which is equal to 2. A signal on the input lead 15*a* represents $2^2$ which is equal to 4. A signal on the input lead 16*a* represents $2^3$ which is equal to 8. The appropriate value of the binary signals being supplied on the input leads 13 through 16 is illustrated in the drawings. Connected by lead 17 to the output of the logic gates 11 and 12, respectively, is a signal indicating device, such as a lamp 18, which is illuminated when the gating device to which it is connected is activated. The other sides of the illuminating devices are connected to ground or minus 6 volts depending on the gating circuit being utilized. Each of the illuminating devices 18** have printed thereon, a numeral representing the decimal value of the signals being supplied to the logic gates. In the particular embodiment illustrated, only the decimal values or decimal constituents 0 through 9 are represented.

A feed-back circuit is connected to the output of selected logic gates 11 and 12 for supplying an inhibit signal to certain logic gates for preventing activation of the logic gates. For example, a feed-back circuit including lead 19 supplies an inhibit signal from the output of the logic gate 11 associated with the "0" circuit for inhibiting the operation of the logic gates associated with the lamps representing decimal values 1, 2 and 4, respectively. Thus, when the logic gate 11 associated with the lamp "0" is energized a minus 6 volt inhibit signal is supplied to the logic circuits associated with lamps representing decimal values 1, 2 and 4. Particular voltages, such as "0" volts for a false signal and minus 6 volts for a true signal, will be used in explaining the operation of the decoder, however, it is to be noted that other suitable voltages could be used. A feed-back lead 20 connects the output signal from the logic gate associated with the lamp provided for displaying a decimal value 7 when activated to the input leads associated with lamps 3, 5 and 6. A similar feed-back circuit including lead 21 couples the output signal from the logic circuit associated with lamp 9 to an input lead of the logic gate associated with lamp 8. When the logic gates associated with the lamps 0, 7 and 9 are activated a feed-back signal is fed back to the above-mentioned logic circuits to inhibit the operation of such. Thus, erroneous illumination of the display lamps representing the binary values 0 through 9 is prevented.

Referring to the truth table illustrated in FIG. 4, it can be seen that when there is a false signal on all of the input leads 13 through 16, respectively, associated with the "0" lamp such will activate the logic gate causing the lamp to be illuminated. Since the logic gates associated with the lamps 1, 2 and 4 have signals being supplied to the input thereof, which would normally activate such, it is necessary that an inhibit signal which is in the form of a minus 6 voltage be supplied from the output of the logic gate associated with the "0" lamp to the input of the logic gates associated with the lamps 1, 2 and 4 to inhibit their activation. Thus, in order for the logic gate associated with lamp 1 to be illuminated there would have to be a false signal on the leads 14, 15 and 16, as well as a "0" voltage being supplied over lead 19.

The truth table illustrates what signals are necessary to illuminate the lamps associated with the logic circuits. For example, in order to illuminate the lamp 18 provided for displaying a decimal value 8 it is necessary to have a true signal which represents a minus 6 volts on the input lead 16 and a true feed-back signal of a minus 6 volts on lead 21. In order to illuminate the lamp 18 provided for displaying a decimal value 9 it is only necessary to place a binary true signal of a minus 6 volts on the input leads 13 and 16, respectively. It is noted that no other lamp could be activated solely by true signals on these two leads.

FIG. 2 illustrates the logic circuit 11 in schematic form. Interposed in each of the input leads 13 through 16, respectively, is a diode 22. The anodes of the diodes 22 are connected to a common junction 23 which is coupled through a resistor 24 to a positive 12 volt potential. Another resistor 25 is connected between the junction 23 and a junction 26. A negative 18 volt potential is applied to the junction 26 through resistor 27 and lead 28. Junction 26 is coupled to the base electrode 29 of a NPN transistor 30. The emitter electrode 31 is connected to a negative six volt potential, while the collector is connected by means of lead 33 to a lamp 18 which in the circuit illustrated is for illuminating the "0" decimal signal. The other side of the lamp is connected to ground. The feed-back lead 19 is taken off the collector electrode 32 and is fed back to the appropriate logic circuit inputs. All of the other logic circuits 11 are identical to the circuit illustrated in FIG. 2 with the exception that the logic circuits provided for illuminating the lamps for displaying the decimal signals 1, 2 and 4 do not have a feed-back lead. Also, one of the input leads of each of the last-mentioned logic circuits is used for receiving a feed-back signal from the logic circuit associated with the lamp 18 for displaying a "0" signal.

In operation when a false signal or "0" voltage is on all four of the input leads 13 through 16, respectively, junction 23 goes to "0" volts. When any one of the input leads has a true signal, or minus 6 volts supplied thereto, the junction 23 approaches minus 6 volts. When the junction 23 is at substantially zero volts the voltage at the base 29 of transistor 30 goes slightly more positive than the voltage at the emitter electrode 31 turning on the transistor. When the transistor is turned on current flows from ground illuminating the "0" lamp 18, and flows through the collector electrode 32, and out the emitter electrode 31. A minus 6 volt inhibit signal is fed back on lead 19 to an input of the logic circuits associated with the lamps 1, 2 and 4. If there is a minus 6 volts or true signal on any one of the input leads, then the transistor 31 remains cut-off and there is a "0" voltage signal being fed back on the feed-back lead 19 which would not inhibit the operation of the logic circuits receiving such signal.

Logic circuit 12 is similar to logic circuit 11 with the exception that the voltages are changed, and a PNP transistor 34 is utilized. The reason for using a pair of logic circuits 11 and 12, respectively, is to make optimum use of the feed-back and logic signals available. The diodes 35 have their cathodes connected to a common junction 36 which is, in turn, connected through resistor 37 to a negative 18 volt potential. Another resistor 38 is connected between junction 36 and junction 39. The junction 39 is connected through a resistor 40 to a positive 12 volt potential. A base electrode 41 of the transistor 34 is also connected to junction 39. An emitter electrode 42 of the transistor 34 is connected to ground by lead 43. Lamp 18 is connected between a negative 6 volt potential and a collector electrode 44 by means of lead 45. A feed-back lead 20 is also connected to the collector electrode 44 of the transistor 34. The particular logic circuit illustrated in FIG. 3 is that utilized in illuminating the decimal constituent of 7, and the other logic circuits 12 are identical with the exception of the feed-back leads and the number of input leads.

In operation, when a true signal of a minus 6 volts is placed on all of the input leads 13, 14 and 15 the voltage at junction 36 approaches a minus 6 volts. This causes the transistor 34 to begin conducting and current flows from the emitter electrode 42 through the collector electrode 44 illuminating lamp 18. A feed-back signal of "0" volts is supplied to an input terminal associated with the logic circuits 12 which are provided for illuminating lamps 3, 5 and 6, and inhibits the operation of such logic circuits. When the transistor 34 is not conducting a minus 6 volt feed-back signal is supplied over lead 20 to the inputs of the above-mentioned logic circuits allowing such to be activated if the proper input signals are present on the other input leads.

While a preferred embodiment of the invention has been described using specific terms and voltages, such description is for illustrative purposes only, and it is to be understood that changes and variations may be made without departing from the spirit or scope of the following claims.

What is claimed is:

1. A decoder for converting binary coded decimal signals to their decimal constituents for display comprising:

(A) a logic gating circuit provided for each decimal constituent which is to be produced;

(B) a display means connected to the output of each gating circuit being activated responsive to selected binary input signals being supplied to said respective gating circuits;

(C) selected parallel input leads connected to each of said gating circuits for receiving binary coded signals in parallel form for activating a particular gating circuit when said binary coded signals make-up the decimal constituent for said particular gating circuit;

(D) a plurality of feed-back circuits each connected to the output of a selected logic gating circuit and being connected for supplying an inhibit signal to other of said logic gating circuits for preventing activation of said other logic gating circuits when a selected logic gating circuit is activated;

(E) a logic gating circuit provided for each of the decimal constituents zero through nine;

(F) said feed-back circuits being coupled to the outputs of said logic gating circuits provided for displaying the decimal constituents zero, seven and nine;

(G) said feed-back circuits being connected to the outputs of said logic gating circuits provided for the seven constituent for supplying inhibit signals to the logic gating circuits provided for the three, five and six constituents when activated; and (H) said feed-back circuits being connected to the outputs of said logic gating circuits provided for the nine constituent for supplying inhibit signals to the logic gating circuit provided for the eight constituent;

(I) whereby a minimum of input binary coded signals can be utilized to energize a display means while preventing other display means from being erroneously energized.

2. The decoder as set forth in claim 1 wherein:

(A) each of said logic gating circuits includes an "AND" gate logic element;

(B) a transistor coupled to the output of said "AND" gate being activated responsive to a signal passing through said "AND" gate, and (C) said display means being coupled to the output of said transistor of each logic gating circuit.

References Cited

UNITED STATES PATENTS

| | | | |
|---|---|---|---|
| 3,149,322 | 9/1964 | Wheeler | 340—347 |
| 3,197,760 | 7/1965 | Cohn et al. | 340—347 |
| 3,310,800 | 3/1967 | Havens | 340—347 |
| 3,336,468 | 8/1967 | Lindaman et al. | 235—155 |

MAYNARD R. WILBUR Primary Examiner

G. R. EDWARDS, Assistant Examiner

U.S. Cl. X.R.

340—347